United States Patent
Li et al.

(10) Patent No.: US 7,350,049 B1
(45) Date of Patent: Mar. 25, 2008

(54) METHOD AND APPARATUS FOR MANAGING ACCESS TO A FILE ALLOCATION TABLE

(75) Inventors: XiaoQiang Li, BeiJing (CN); Jun Wang, BeiJing (CN); ChuanEn Jin, BeiJing (CN)

(73) Assignee: Vimicro Corporation, Beijing (CN)

( * ) Notice: Subject to any disclaimer, the term of this patent is extended or adjusted under 35 U.S.C. 154(b) by 326 days.

(21) Appl. No.: 11/226,618

(22) Filed: Sep. 13, 2005

(51) Int. Cl.
*G06F 12/02* (2006.01)

(52) U.S. Cl. .................. 711/170; 711/112; 711/202; 707/205

(58) Field of Classification Search ........... 711/170, 711/171, 207, 208, 202, 112, 114, 113, 117, 711/209; 707/205
See application file for complete search history.

(56) References Cited

U.S. PATENT DOCUMENTS

| | | | | |
|---|---|---|---|---|
| 5,586,301 A * | 12/1996 | Fisherman et al. | .......... | 711/152 |
| 5,715,455 A * | 2/1998 | Macon et al. | ............... | 707/205 |
| 5,930,829 A * | 7/1999 | Little | .......................... | 711/170 |
| 6,823,417 B2 * | 11/2004 | Spencer | ...................... | 711/207 |
| 7,027,241 B2 * | 4/2006 | Chu et al. | ..................... | 360/31 |

* cited by examiner

*Primary Examiner*—Pierre-Michel Bataille
(74) *Attorney, Agent, or Firm*—Joe Zheng

(57) ABSTRACT

Techniques for managing access to a file allocation table in an external storage device are disclosed. According to one aspect of the techniques, an accelerated apparatus, as an interface, is provided between an external storage and a device (or a host processor thereof). The accelerated apparatus comprises a center controlling unit, a FAT storage sector calculating unit, a FAT storage sector accessing unit, a buffer and a result storing unit and configured to manage the access to the FAT so that the host process is freed up to perform other tasks.

16 Claims, 8 Drawing Sheets

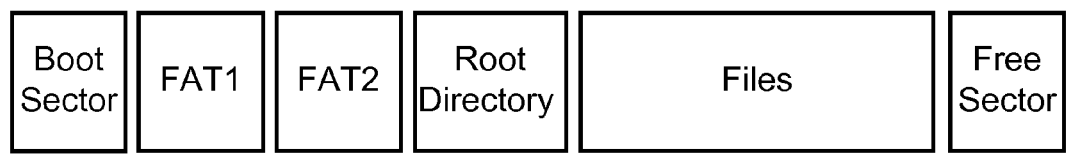
(Prior art) FIG. 1
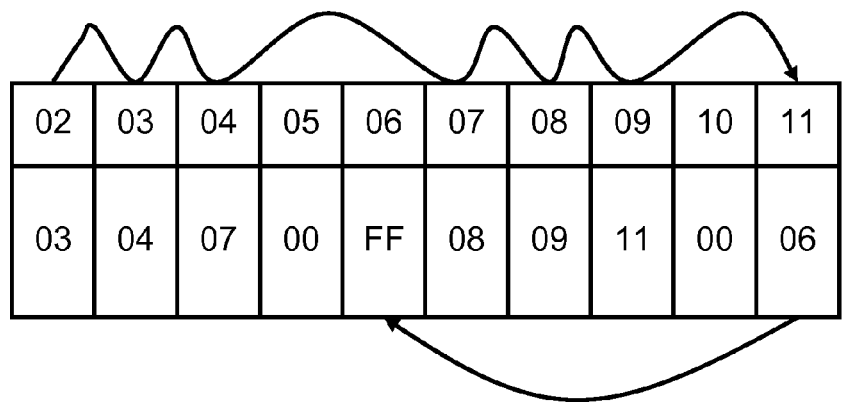
(Prior art) FIG. 2

| a | a+1 | a+2 | a+3 | ... | b | b+1 | b+2 | b+3 | ... |
|---|-----|-----|-----|-----|---|-----|-----|-----|-----|
| a+1 | a+2 | a+3 | b | ... | b+1 | b+2 | b+3 | c | ... |

| c | c+1 | c+2 | c+3 | c+4 | ....... | d | | |
|---|-----|-----|-----|-----|---------|---|--|--|
| c+1 | c+2 | c+3 | c+4 | d | ...... | | | |

FIG. 4A

| a | 4 |
|---|---|
| b | 4 |
| c | 5 |

FIG. 4B

METHOD AND APPARATUS FOR MANAGING ACCESS TO A FILE ALLOCATION TABLE

BACKGROUND OF THE INVENTION

1. Field of the Invention

The present invention relates to data processing, and more particularly to apparatus and method for managing a file allocation table more efficiently.

2. Description of Related Art

The FAT file system is well known and is described in several publications including IBM DISK OPERATING SYSTEM TECHNICAL REFERENCE, July 1988, published by IBM, which is hereby incorporated by reference. Briefly, in a FAT file system, a disk is divided into clusters of 512 byte sectors. A file is stored in one or more clusters dependent upon the file length. The disk also contains a boot record, a file allocation table (FAT), a root directory, and a data area containing subdirectories and files. The directory is a tree structured directory system. A given file is found by specifying the drive it is on, the directory path, and a filename, e.g., c:/dir1/dir2/filename.ext.

FIG. 1 shows a block diagram of the disk format of the FAT file system. A brief description of the FAT file system follows. The FAT file system revolves around the File Allocation Table (FAT). Each logical volume is associated with its own FAT, which serves two important functions: it contains the allocation information for each file on the volume in the form of linked lists of allocation units and it indicates which allocation clusters are free for assignment to a file that is being created or extended. When a disk is formatted in accordance with the FAT file system, a boot sector is written in sector zero. This is followed by one or more file allocation tables. Each file allocation table is physically located on one or more definable FAT storage units of the formatted disk. Although the definable FAT storage unit is typically a 512 byte sector on the external disk storage device, it is understood that the size of the FAT storage unit may be greater or less than 512 bytes, such as 256 bytes or 1024 bytes. The file allocation tables are followed by a root directory. The root directory is followed by the volume files. The boot sector contains various descriptive information such as the volume in an area referred to as the boot parameter block or BPB, a drive number and a volume I.D., the number of sectors per FAT, as well as a bootstrap routine.

The file allocation table is divided into fields that correspond directly to the assignable clusters on a disk. The first two FAT entries are reserved and the remaining FAT entries describe the use of the corresponding disk clusters. Each file's entry in a root directory contains the number of the first cluster assigned to that file, which is used as an entry point into the FAT. From the entry point on, each FAT field contains the number of the next cluster in the file, until an end-of-cluster mark is encountered. FIG. 2 illustrates an example of a portion of a file allocation table, which specifically indicates the linked list of the clusters allocated to a file.

The FAT system is not only used in personal computer, notebook computer and but also used in some relatively small consumer electronic products, such as digital music players and cameras, personal digital assistants (PDAs), video cameras, cellular phones, and so on. Generally, when accessing the files stored in a hard disk, a memory card or an external storage device, the FAT has to be first read into a ROM of a computer or buffer storage of a consumer electronic product. With the information of the FAT, a central processing unit (CPU) can send the appropriate access commands to the storage to access a desired file stored on the external storage device.

The FAT might be small enough to be retained in the random access memory (ROM) of the commonly used personal computer (PC) or notebook computer at all times. However, the FAT can become relatively too large to be held in the buffer storage of some relatively small consumer electronic products at all times (e.g., a PDA), thus degrading the system performance and data throughput of a device. In any case, the center processing unit in a device, regardless it is a PC, a notebook and a consumer electronic product, manages directly the FAT, thereby occupying some resource of the CPU and adversely effecting performance of other tasks that need the resource of the CPU to perform.

Thus there is a need for techniques for accessing a file allocation table more efficiently with minimum impact on the resource of a CPU.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for managing access to a file allocation table in an external storage device. According to one aspect of the techniques, an accelerated apparatus, as an interface, is provided between an external storage and a device (or a host processor thereof). The accelerated apparatus comprises a center controlling unit, a FAT storage sector calculating unit, a FAT storage sector accessing unit, a buffer and a result storing unit and configured to manage the access to the FAT so that the host process is freed up to perform other tasks. Depending on implementation, the accelerated apparatus may be embedded into an external storage device, integrated with a processor, into a chip or a standalone device.

The present invention may be implemented in hardware and software as a system, an apparatus or a method. According to one embodiment, the present invention is an accelerated apparatus for accessing a FAT, the apparatus comprises: a center controlling unit obtaining a cluster number from a host processor or a random cluster number as a first cluster index number and determining a next cluster index number until encountering an ending, a FAT storage sector calculating unit calculating a number of a FAT storage sector corresponding to the cluster index number, a FAT storage sector accessing unit accessing the FAT storage sector corresponding to the calculating result, a buffer storing data that the FAT storage sector accessing unit reads from/writes to the FAT storage sector corresponding to the calculating result; and a result saving unit storing a linked list of clusters which the center controlling unit reads from/writes into the buffer according to the cluster index number.

According to another embodiment, the present invention is a method for accessing a FAT in an external storage device, the method comprises obtaining a starting cluster number assigned to a file from a host processor, sending the starting cluster to a FAT storage sector calculating unit as a first cluster index number, calculating, by a FAT storage sector calculating unit, a number of the FAT storage sector corresponding to the first cluster index number, reading, by a FAT storage sector accessing unit, a part of the FAT according to the calculating result into a buffer, reading the first cluster index number in the buffer, and storing the first cluster index number to a result saving unit to obtain a linked list of clusters assigned to the file.

According to still another embodiment, the present invention is a method for accessing a FAT in an external storage device, the method comprises obtaining a cluster number, sending cluster number to a FAT storage sector calculating unit as a first cluster index number by a center controlling unit, calculating, by a FAT storage sector calculating unit, a number of the FAT storage sector corresponding to the cluster index number, reading, by the FAT storage sector accessing unit, a part of the FAT according to the calculating result into the buffer, reading a content of the cluster index number, determining whether or not the cluster index number is free according to the content, storing the cluster index number to a result saving unit by the center controlling unit when the cluster index number is free, and sending the cluster index number+N to the FAT storage sector calculating unit as a next cluster index number.

According to yet another embodiment, the present invention is a system for accessing a FAT, the system comprises an external storage device, wherein the FAT is included in the external storage device, a device to read or write data to or from the external storage device, an interface coupled between the external storage device and the device to facilitate an access to the FAT, wherein the interface includes a FAT storage sector calculating unit and a FAT storage sector accessing unit, the FAT storage sector calculating unit determines a number of a FAT storage sector from a first cluster index number from the FAT, the FAT storage sector accessing unit accessing the FAT storage sector corresponding to the number, and a buffer storing data that the FAT storage sector accessing unit reads from/writes to the FAT storage sector.

One of the features, benefits and advantages in the present invention is to provide techniques for managing access to a file allocation table in an external storage device.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1 is a diagram showing the disk format of the FAT file system;

FIG. 2 is an example of a fragment of a file allocation table, which specifically indicates the linked list of the clusters allocated to a file;

FIG. 4A is another example of a linked list of the clusters allocated to a file;

FIG. 4B shows a packed format of a linked list of clusters shown in FIG. 3;

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

In the prior art, a host processor provided in a device, such as a personal computer, a notebook computer or some consumer electronic products, accesses directly a FAT stored in an external storage device, such as a hard disk, a floppy disk and a memory card, thus occupying some resources of the host processor. Different from the prior art, the present invention provides apparatus and method for accessing the FAT with minimum impact on the host processor. According to one aspect of the present invention, a host processor is freed up while a FAT in an external storage device is accessed.

Figure 3:
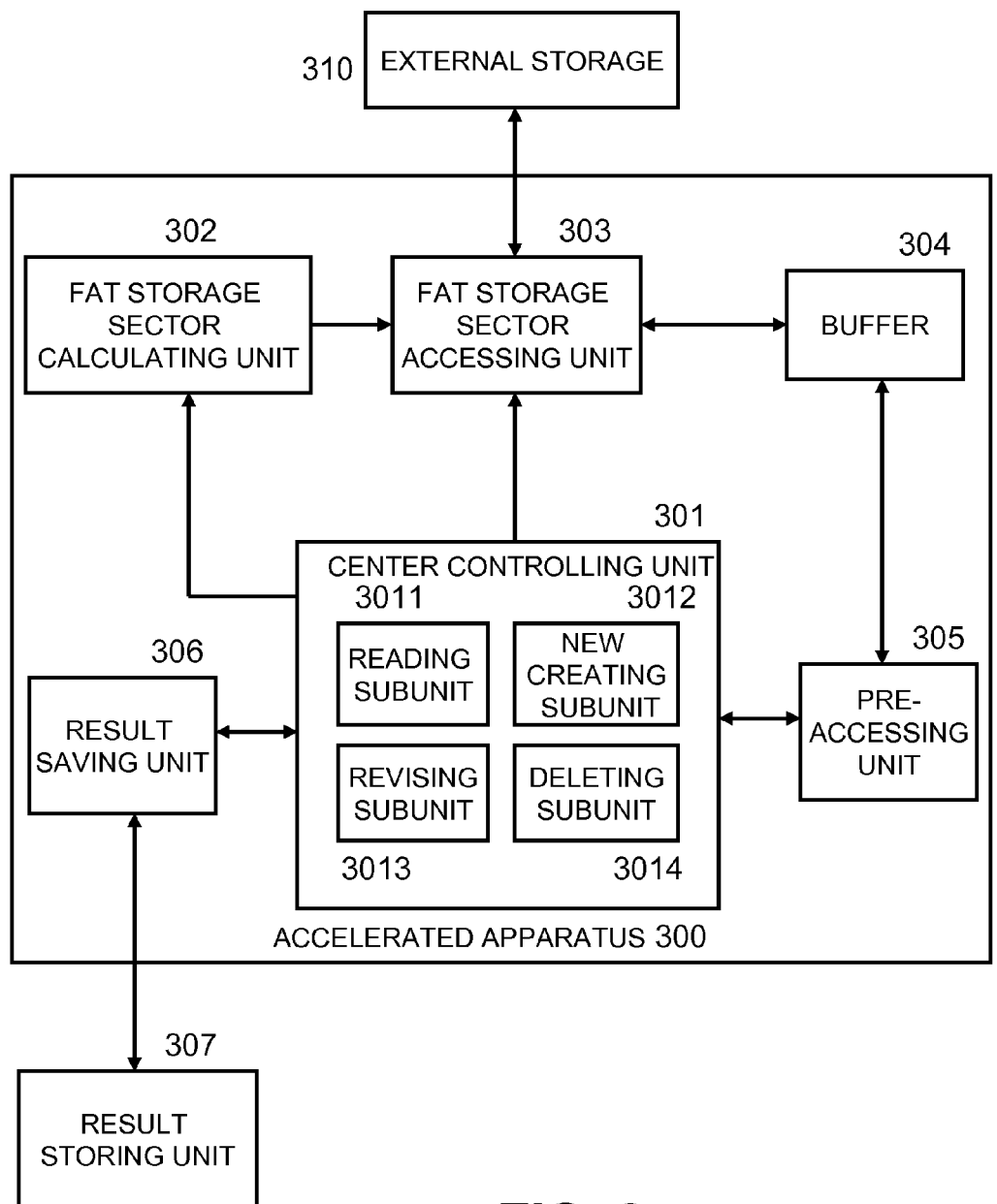
FIG. 3 is a block diagram schematically showing a physical structure of an accelerated apparatus.

Referring to FIG. 3, there shows a functional block diagram of an exemplary accelerated apparatus 300. Depending on implementation, the accelerated apparatus 300 might be embedded into an external storage device, integrated with a processor, into a chip or a standalone device. In one embodiment as shown in FIG. 3, the accelerated apparatus 300 comprises a center controlling unit (CCU) 301, a FAT storage sector calculating unit (FAT storage sector CU) 302, a FAT storage sector accessing unit (FAT storage sector AU) 303, a buffer 304, a data pre-access unit 305, and a result saving unit 306.

An external storage device 310 shown in FIG. 3 is provided for storing the FAT and other files. A result storing unit 307 is a random access memory which a host processor (not shown) can directly access. In one embodiment, the result storing unit 307 may be integrated with the accelerated apparatus 300, such as being combined with the result saving unit 306 as one unit. Optionally, the result saving unit 306 can be configured to function as the result storing unit 307 in another embodiment. The buffer 304 typically has the volume of 512 bytes but may have any predefined capacity, such as 1024 bytes or 2048 bytes etc.

The CCU 301 comprises a reading subunit 3011, a new creating subunit 3012, a revising subunit 3013 and a deleting subunit 3014. The accelerated apparatus 300 is able to directly access the FAT in the external storage device 310 in response to an accessing command of the host processor. According to the subunits of the CCU 301, the accelerated apparatus 300 performs reading accessing, deleting accessing, revising accessing, new creating accessing functions. It is understood to those skilled in the art that not all subunits must be implemented in the CCU 301. The detailed explanation about the accessing operation, including reading access, new creating access, deleting access and revising access, is described below.

Figure 6:
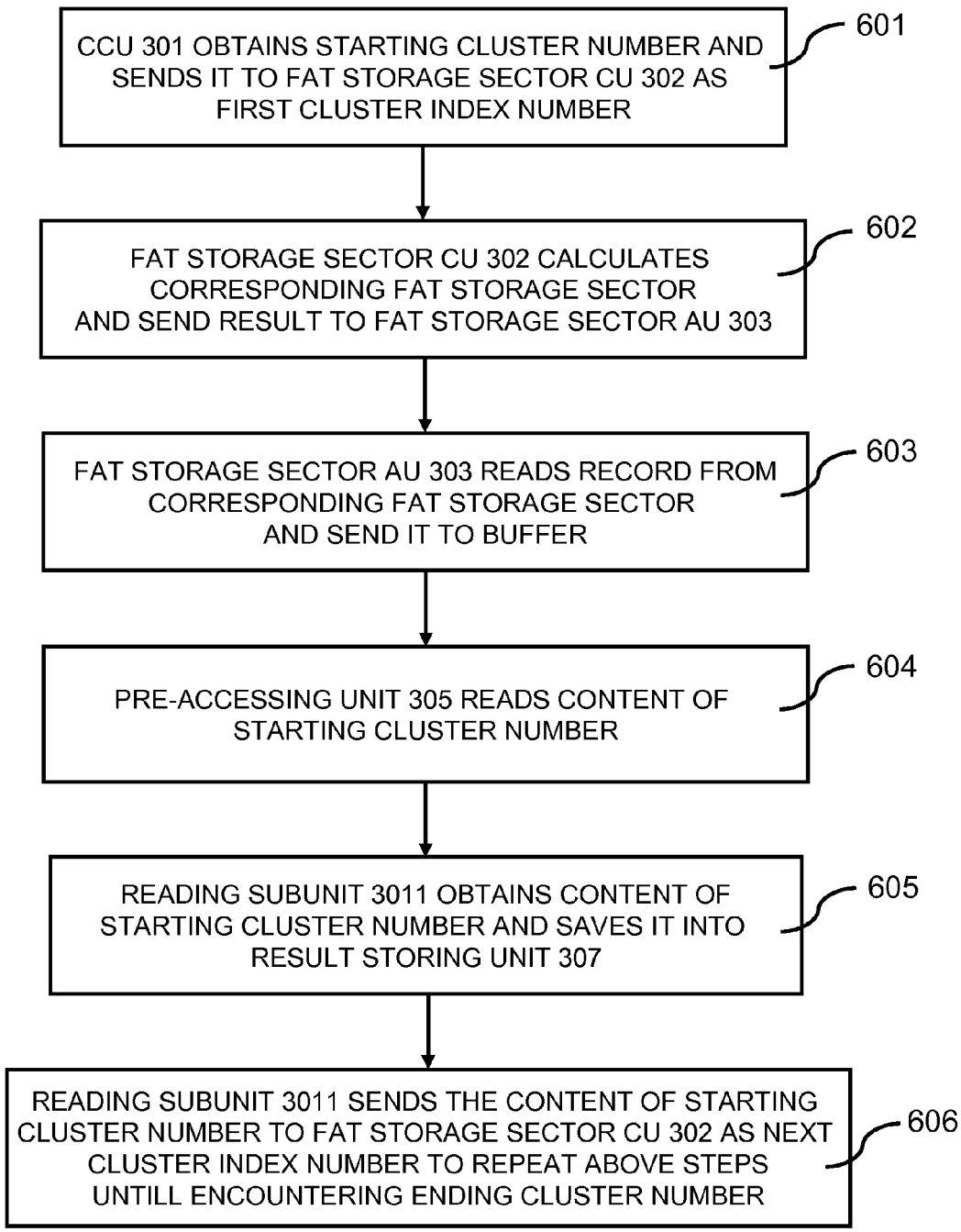
FIG. 6 shows an operation procedure of reading access to the FAT in the external storage.

To facilitate the understanding of the present invention, the operation procedure of reading access to the FAT in an external storage is described first. When a host processor makes a reading access request to read an object file stored in the external storage device 310, a starting cluster number which is contained in a root directory of the external storage device 310 and assigned to the object file is sent to the accelerated apparatus 300. As shown in FIG. 6 which may be understood in conjunction with FIG. 3, at 601, the CCU 301 obtains the starting cluster number of the object file and sends it to the FAT storage sector CU 302. At 602, the FAT storage sector CU 302 calculates the number of the FAT storage sector in which the starting cluster number is stored and sends the calculating result to the FAT storage sector AU 303. In the illustrated embodiment, the calculation of the FAT storage sector CU 302 refers to the following formula:

$$LBA = FAT_{start} + \frac{Index \times Len_{unit}}{2 \times Size_{sector}} \quad Len_{unit} = \begin{cases} 3, fat12 \\ 4, fat16 \\ 8, fat32 \end{cases} \quad (1)$$

where LBA represents the number of the FAT storage sector in which a part of the FAT is stored, $FAT_{start}$ represents the starting number of the FAT storage sector, Index represents the cluster index number and the starting cluster number serves as the first cluster index number; $Size_{sector}$ represents the volume of each FAT storage sector, such as 512 byte, 1024 byte, 2048 byte, 4096 byte, and $Len_{unit}$ represents the volume occupied by each cluster number. Each cluster number in FAT 12, FAT 16 and FAT 32 occupies 3, 4, 8 bytes, respectively.

At 603, the FAT storage sector AU 303 reads out a part of FAT stored in the FAT storage sector determined at 602 and sends the part of FAT to the buffer 304. At 604, the pre-accessing unit 305 reads out the content contained in the starting cluster number which is regarded as the first cluster index number. At 605, the reading subunit 3011 of CCU 301 reads the content contained in the starting cluster number and stores it into the result saving unit 306. At 606, the reading subunit 3011 of CCU 301 sends the content contained in the starting cluster number to the FAT storage sector CU 303 as the next cluster index number to repeat above processes until an ending cluster mark, determined by the reading subunit 3011, is encountered. If this calculating result of the FAT storage sector CU 302, according to the next cluster index number, is equal to the last calculating result, the procedure is taken to 604 and continues the circle; otherwise, the procedure is taken to 603 and continues the circle.

When an ending cluster mark is encountered at 606, the entity linked list of clusters assigned to the object file is collected into the result saving unit 306, the reading access procedure of the accelerated apparatus 300 to the FAT exists.

Lastly, the host processor is able to directly access the linked list of clusters assigned to the object file.

Generally, there are a lot of contiguous ranges of clusters allocated to a file. For example, referring to FIG. 4A, the number of the clusters allocated to a file is a, a+1, a+2, a+3, b, b+1, b+2, b+3, c+1, c+2, c+3, c+4, d . . . , respectively, where a, b, c, d represent different natural numbers, respectively. Hence, the FAT will contain the repeated content because each cluster number contains a pointer pointing to a contiguous cluster number. In order to further reduce the volume of the linked list of the clusters and speed up to access the FAT, in a preferred embodiment, a packed method for compressing the FAT is employed.

Figure 5:
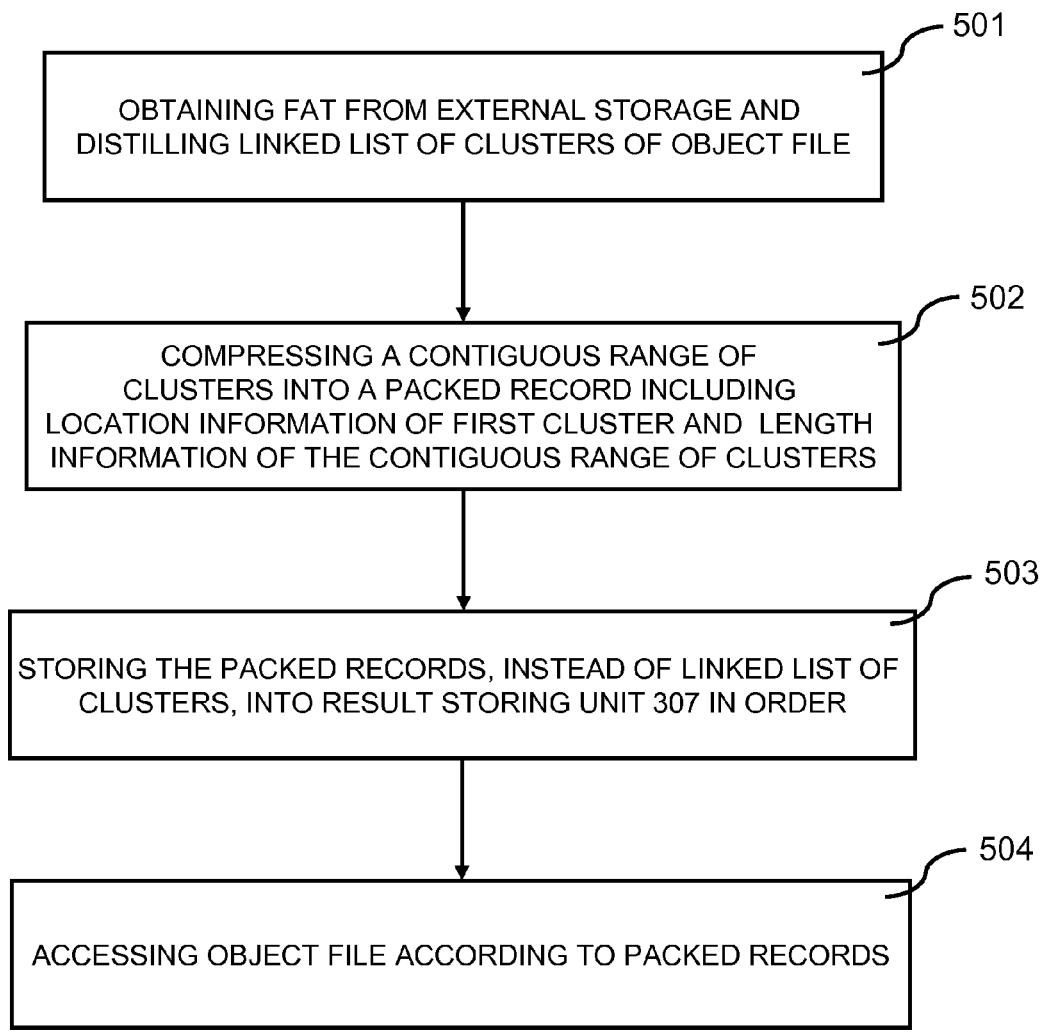
FIG. 5 shows a packed method for compressing a linked list of clusters of FAT.

Referring now to FIG. 5, at 501, the FAT is obtained from an external storage device and a linked list of clusters assigned to a file is distilled from the FAT. The apparatus 300 shown in FIG. 3 may be used to fulfill the distilling at 501. FIG. 5 shows a flowchart or process of how to obtain the FAT from the external storage device and distill the linked list of clusters of the file, where the linked list of clusters may be initially stored in the result saving unit 306. In one embodiment, a conventional method to obtain the FAT and distill the linked list of clusters may also be adapted at 501 of the packed method for compressing the FAT. As an example, the linked list of the clusters assigned to a file shown in FIG. 4A is a, a+1, a+2, a+3, b, b+1, b+2, b+3, c+1, c+2, c+3, c+4, d . . . .

At 502, a contiguous range of clusters of the linked list of clusters is compressed into a pack record including location information which represents the cluster number in the illustrated embodiment, the first cluster and length information of the contiguous range of clusters. An example is illustrated in FIG. 4B, a first contiguous range of clusters is illustrated as a, a+1, a+2, a+3, so the first packed record includes a as the location information of the first cluster, and 4 as the length information. At 502, the other contiguous ranges of clusters can be compressed. At 503, the packed records, instead of the linked list of clusters, are stored in a random access memory in order which the contiguous ranges of clusters are located at the linked list of the clusters.

In one embodiment, the pack records are stored in the result storing unit 307 which the host processor can directly access. At 504, the file is accessed by the host processor according to the packed records, instead of the linked list of clusters. In one embodiment, the packed format of the linked list of clusters takes advantage of characteristic of contiguous range of clusters to further reduce volume of the linked list of clusters and speed up to access the FAT.

Figure 7:
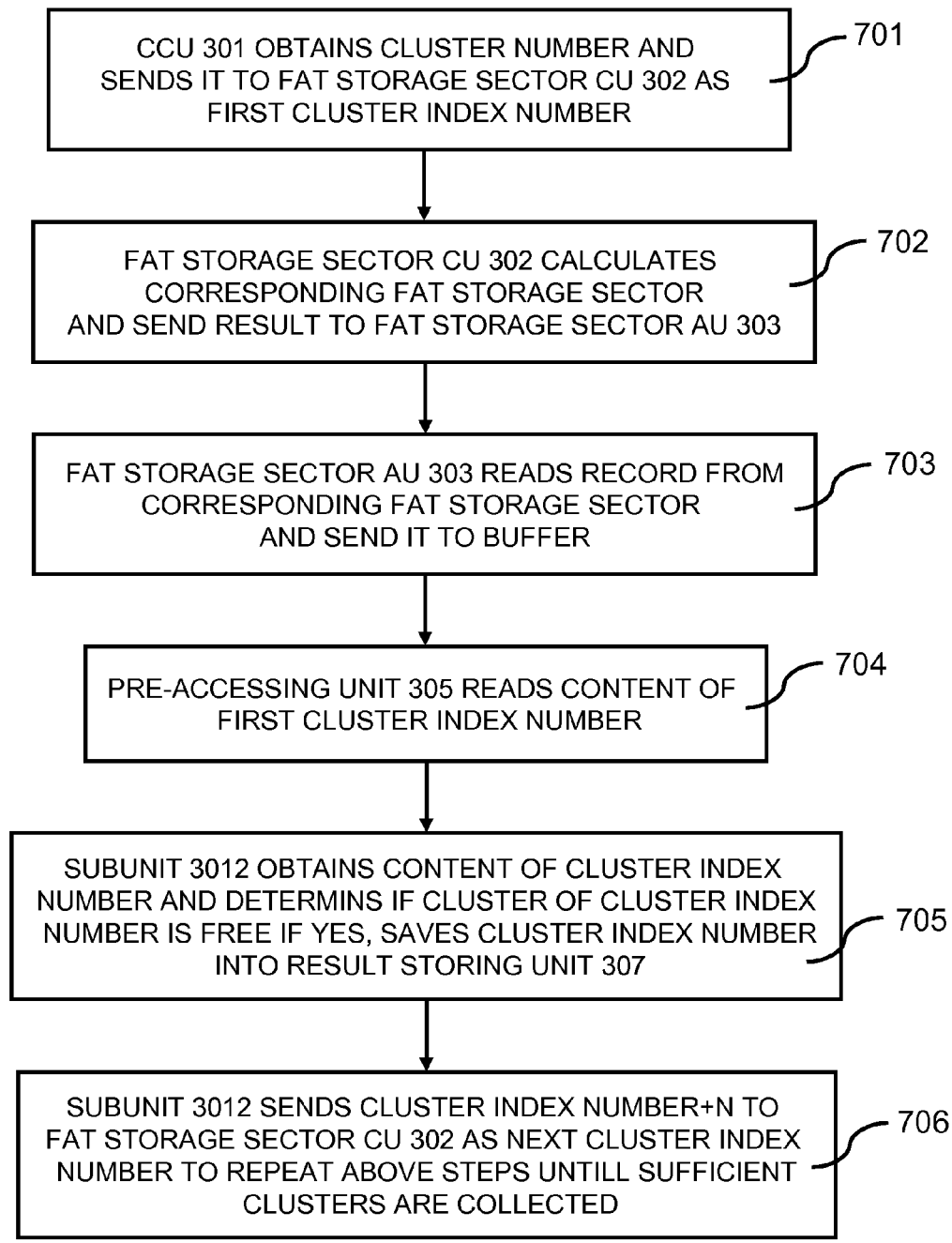
FIG. 7 shows an operation procedure of new creating access to the FAT in the external storage.

When the host processor makes a new create accessing request, referring now to FIG. 7 that is to be understood in conjunction with FIG. 3, at 701, CCU 301 obtains a cluster number from the host processor or a random cluster number, and subsequently sends it to the FAT storage sector CU 302 as the first cluster index number. At 702, the FAT storage sector CU 302 calculates the number of the FAT storage sector in which the cluster index number is stored and sends the calculating result to the FAT storage sector AU 303, where the calculation of the FAT storage sector CU 302 refers to the formula (1) mentioned above. At 703, the FAT storage sector AU 303 read out a part of FAT stored in the FAT storage sector determined in at 702 and sends the part of FAT to the buffer 304.

At 704, the pre-accessing unit 305 reads out the content contained in the first cluster index number. At 705, the new creating subunit 3012 of CCU 301 determines if the cluster of this cluster index number is free according to the content thereof. If yes, the new creating subunit 3012 stores the cluster index number into the result storing unit 307 by the result saving unit 306.

At 706, the new creating subunit 3012 sends the cluster index number+N (N represents the natural number greater than zero, such as 1) to the FAT storage sector CU 303 as the next cluster index number to repeat the above steps until sufficient free clusters are collected, determined by the new creating subunit 3012. If this calculating result of the next cluster index number is equal to the last, the procedure is taken to 704 and continues the circle; otherwise, the procedure is taken to 703 and continues the circle. When there are sufficient free clusters collected into the result storing unit 307, a new link list of free cluster is created in the FAT, the new creating access procedure of the accelerated apparatus 300 to the FAT exists. When there are no sufficient free spaces on the external storage device, an error message is fed back to the host processor and exits the procedure. Eventually, the host processor writes data according to the linked list of the free clusters.

Figure 8:
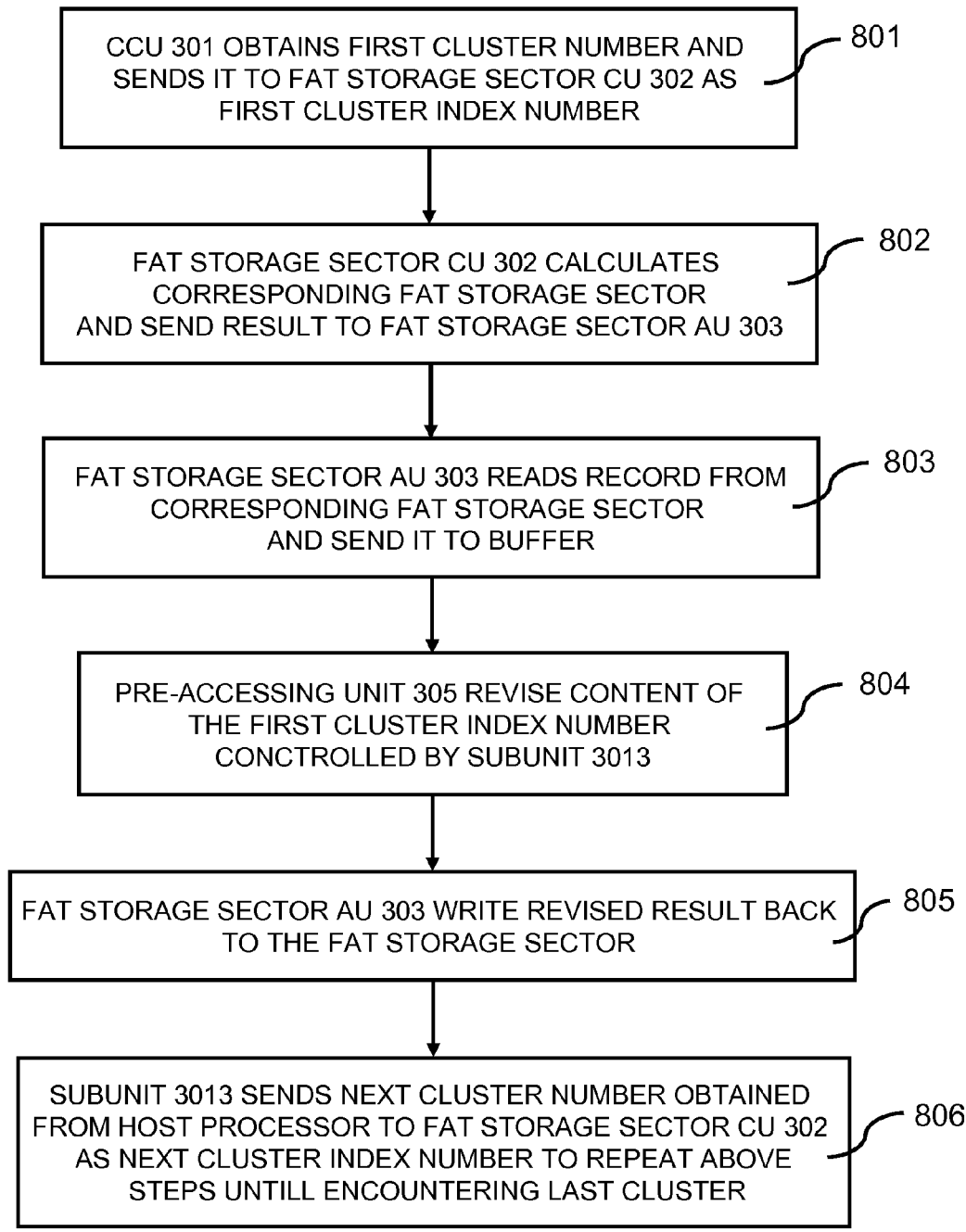
FIG. 8 shows an operation procedure of revising access to the FAT in the external storage.

When the host processor makes a revise accessing request and sends a new linked list of the clusters to the CCU 301, referring now to FIG. 8 that may be understood in conjunction with FIG. 3, at 801, CCU 301 obtains the first cluster number from the host processor and subsequently sends the first cluster index number to the FAT storage sector CU 302 as a first cluster index number. At 802, the FAT storage sector CU 302 calculates the number of the FAT storage sector according to the above formula (1) and sends the calculating result to the FAT storage sector AU 303. At 803, the FAT storage sector AU 303 reads out a part of FAT stored in the FAT storage sector determined at 802 and sends the part of FAT to the buffer 304. At 804, the revising subunit 3013 revises the content contained in the first cluster index number in buffer 304 according to the new linked list of the clusters via the pre-accessing unit 305. At 805, the FAT storage sector AU 303 writes the revised result back to the FAT storage sector controlled by the revising subunit 3013. At 806, the CCU 301 obtains the next cluster number according the new linked list of clusters of the host processor and sends it to the FAT storage sector CU 302 as the next cluster index number to repeat the above steps until a last cluster of the new link list of the host processor is encountered.

Figure 9:
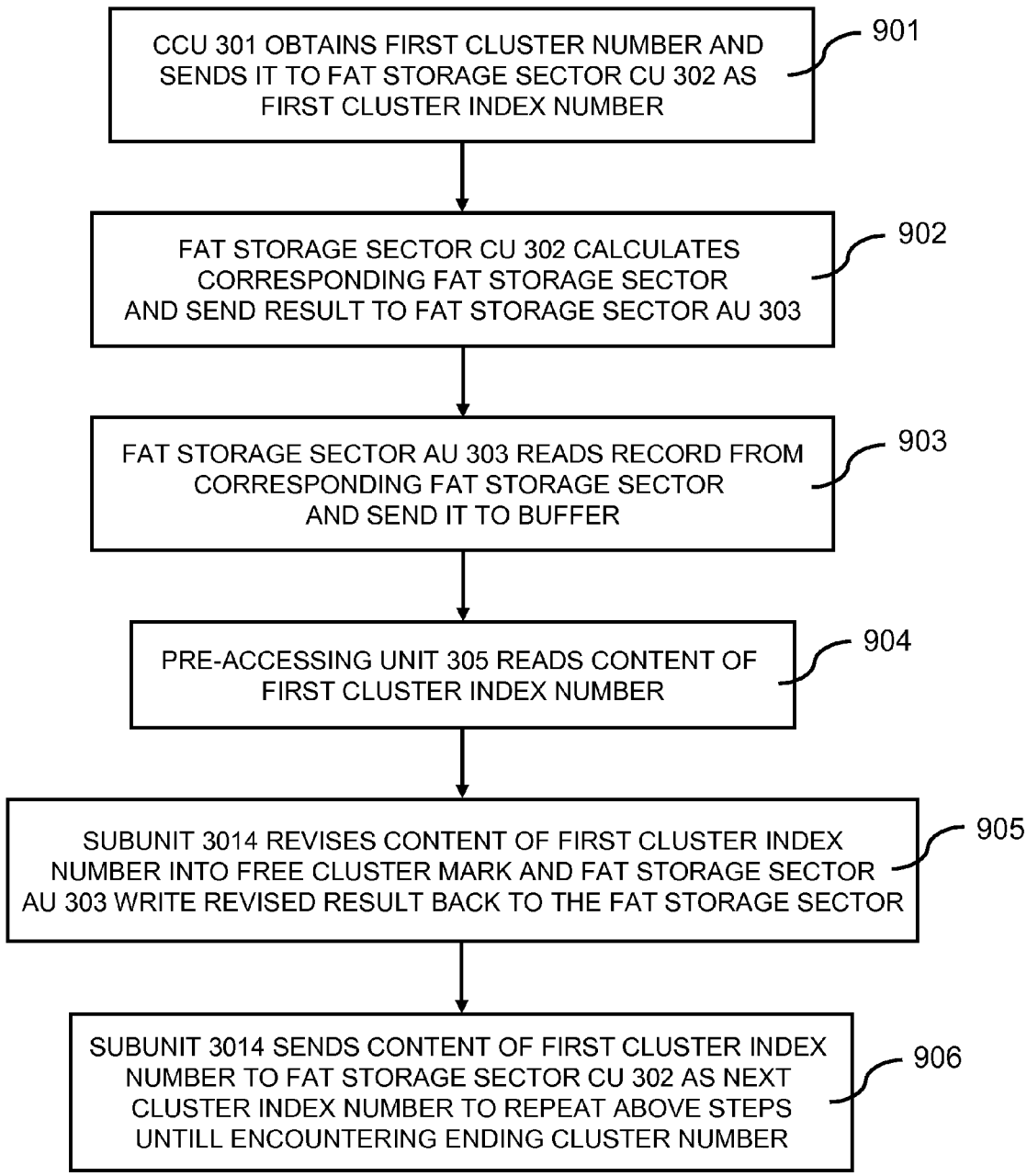
FIG. 9 shows an operation procedure of deleting access to the FAT in the external storage.

When the host processor makes a delete accessing request and sends a first cluster number to the CCU 301, referring now to FIG. 9 which is to be understood in conjunction with FIG. 3, at 901, CCU 301 obtains the first cluster number from the host processor and subsequently sends it to the FAT storage sector CU 302 as a first cluster index number. At 902, the FAT storage sector CU 302 calculates the number of the FAT storage sector according to the formula (1) and sends the calculating result to the FAT storage sector AU 303. At 903, the FAT storage sector AU 303 reads out a part of FAT stored in the FAT storage sector determined at 902 and sends the part of FAT to the buffer 304. At 904, the pre-accessing unit 305 reads out the content contained in the first cluster index number. At 905, the deleting subunit 3014 of CCU 301 receives the content of the first cluster number and revises the content in the first cluster index number into a free cluster mark and controls the FAT storage sector AU 303 to write the revised result back to the FAT storage sector. At 906, the deleting subunit 3014 sends the content, which is contained in the first cluster before revised, to the FAT storage sector CU 303 as the next cluster index number until an ending cluster mark is encountered.

One of the important features in the present invention is that a host processor is not sent the entire FAT before an access request is made, instead the FAT is managed by an accelerated apparatus so that the host processor is freed up to perform other tasks. Other features, benefits and advantages may be appreciated from the above detailed description of the present invention.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

What is claimed is:

1. An accelerated apparatus for accessing a FAT, the apparatus comprising:
a center controlling unit obtaining a cluster number from a host processor or a random cluster number as a first cluster index number and determining a next cluster index number until encountering an ending;
a FAT storage sector calculating unit calculating a number of a FAT storage sector according to a formula expressed as;

$$LBA = FAT_{start} + \frac{Index \times Len_{unit}}{2 \times Size_{sector}} \quad Len_{unit} = \begin{cases} 3, & fat12 \\ 4, & fat16 \\ 8, & fat32 \end{cases}$$

where LBA represents the number of the FAT storage sector in which a part of the FAT is stored, $FAT_{start}$ represents the starting number of the FAT storage sector, $Index_{unit}$ represents the cluster index number and the starting cluster number serves as the first cluster index number, $Size_{sector}$ represents a volume of each FAT storage sector, and $Len_{unit}$ represents the volume occupied by a cluster number;
a FAT storage sector accessing unit accessing the FAT storage sector corresponding to the calculating result;
a buffer storing data that the FAT storage sector accessing unit reads from/writes to the FAT storage sector corresponding to the calculating result; and
a result saving unit storing a linked list of clusters which the center controlling unit reads from/writes into the buffer according to the cluster index number.

2. The accelerated apparatus as claimed in claim 1, wherein the center controlling unit includes one or more of a reading subunit, a new creating subunit, a revising subunit and a deleting subunit.

3. The accelerated apparatus as claimed in claim 1, further comprising a unit for pre-accessing the buffer according to the cluster index number.

4. The accelerated apparatus as claimed in claim 3, further comprising a result storing unit storing the linked list of clusters from the result saving unit in packed records, each including location information of the first cluster and length information of a contiguous range of clusters in the linked list of clusters.

5. The accelerated apparatus as claimed in claim 1, wherein the accelerated apparatus provides an interface between an external storage device and a processor in a device that reads or writes data to or from the external storage device.

6. A system for accessing a FAT, the system comprising:
an external storage device, wherein the FAT is included in the external storage device;
a device to read or write data to or from the external storage device;
an interface coupled between the external storage device and the device to facilitate an access to the FAT, wherein the interface includes a FAT storage sector calculating unit and a FAT storage sector accessing unit, the FAT storage sector calculating unit determines a number of a FAT storage sector—according to a formula expressed as;

$$LBA = FAT_{start} + \frac{Index \times Len_{unit}}{2 \times Size_{sector}} \quad Len_{unit} = \begin{cases} 3, fat12 \\ 4, fat16 \\ 8, fat32 \end{cases}$$

where LBA represents the number of the FAT storage sector in which a part of the FAT is stored, $FAT_{start}$ represents the starting number of the FAT storage sector, $Index_{unit}$ represents the cluster index number and the starting cluster number serves as the first cluster index number, $Size_{sector}$ represents a volume of each FAT storage sector, and $Len_{unit}$ represents the volume occupied by a cluster number; and
a buffer storing data that the FAT storage sector accessing unit reads from/writes to the FAT storage sector.

7. The method as defined in claim 6, wherein resources of a processor in the device are freed up for accessing the FAT.

8. The method as defined in claim 6, wherein by relying the interface to manage access to the FAT in the external storage device, a processor in the device sends only an accessing request and then is freed up to perform other tasks while accessing the FAT.

9. A method for accessing to a FAT in an external storage device, the method comprising:
obtaining a starting cluster number assigned to a file from a host processor;
sending the starting cluster to a FAT storage sector calculating unit as a first cluster index number;
calculating, by a FAT storage sector calculating unit, a number of the FAT storage sector according to a formula expressed as;

$$LBA = FAT_{start} + \frac{Index \times Len_{unit}}{2 \times Size_{sector}} \quad Len_{unit} = \begin{cases} 3, fat12 \\ 4, fat16 \\ 8, fat32 \end{cases}$$

where LBA represents the number of the FAT storage sector in which a part of the FAT is stored, $FAT_{start}$ represents the starting number of the FAT storage sector, $Index_{unit}$ represents the cluster index number and the starting cluster number serves as the first cluster index number, $Size_{sector}$ represents a volume of each FAT storage sector, and $Len_{unit}$ represents the volume occupied by a cluster number;
reading, by a FAT storage sector accessing unit, a part of the FAT according to the calculating result into a buffer;
reading the first cluster index number in the buffer; and
storing the first cluster index number to a result saving unit to obtain a linked list of clusters assigned to the file.

10. The method as defined in claim 9, wherein the obtaining of the first cluster number comprises:
pre-reading, by a pre-accessing unit, the first cluster number; and
reading the first cluster number from the pre-accessing unit into a center controlling unit.

11. The method as defined in claim 9, wherein the center controlling unit comprises a reading subunit to specially control a reading access to the FAT.

12. The method as defined in claim 9, further comprising:
compressing the linked list of clusters into packed records, each comprising location information of the first cluster and length information of a contiguous range of clusters in the linked list of clusters.

13. The method as defined in claim 9, wherein the FAT storage sector calculating unit and the buffer are in an apparatus that provides an interface between an external storage device and a processor in a device that reads or writes data to or from the external storage device.

14. A method for creating access to FAT, the method comprising:
obtaining a cluster number;
sending the cluster number to a FAT storage sector calculating unit as a first cluster index number by a center controlling unit;
calculating, by a FAT storage sector calculating unit, a number of the FAT storage sector according to a formula expressed as;

$$LBA = FAT_{start} + \frac{Index \times Len_{unit}}{2 \times Size_{sector}} \quad Len_{unit} = \begin{cases} 3, fat12 \\ 4, fat16 \\ 8, fat32 \end{cases}$$

where LBA represents the number of the FAT storage sector in which a part of the FAT is stored, $FAT_{start}$ represents the starting number of the FAT storage sector, $Index_{unit}$ represents the cluster index number and the starting cluster number serves as the first cluster index number, $Size_{sector}$ represents a volume of each FAT storage sector, and $Len_{unit}$ represents the volume occupied by a cluster number;
reading, by the FAT storage sector accessing unit, a part of the FAT according to the calculating result into the buffer;
reading a content of the cluster index number;
determining whether or not the cluster index number is free according to the content;
storing the cluster index number to a result saving unit by the center controlling unit when the cluster index number is free; and
sending the cluster index number+N to the FAT storage sector calculating unit as a next cluster index number.

15. The method as defined in claim 14, wherein the center controlling unit comprises a new creating subunit to control the new creating access to FAT.

16. The method as defined in claim 14, wherein the FAT storage sector calculating unit is in an apparatus that provides an interface between an external storage device and a processor in a device that reads or writes data to or from the external storage device.

* * * * *